United States Patent
K et al.

(10) Patent No.: US 11,288,257 B2
(45) Date of Patent: Mar. 29, 2022

(54) MEMORY OPTIMIZATION USING DATA AGING IN FULL TEXT INDEXES

(71) Applicant: SAP SE, Walldorf (DE)

(72) Inventors: Naveen K, Bangalore (IN); Ajalesh P Gopi, Bangalore (IN); Vittal Gopinatha Pai, Bangalore (IN)

(73) Assignee: SAP SE, Walldorf (DE)

( * ) Notice: Subject to any disclaimer, the term of this patent is extended or adjusted under 35 U.S.C. 154(b) by 1277 days.

(21) Appl. No.: 15/168,223

(22) Filed: May 30, 2016

(65) Prior Publication Data
US 2017/0344599 A1 Nov. 30, 2017

(51) Int. Cl.
*G06F 16/23* (2019.01)
*G06F 16/22* (2019.01)
*G06F 16/31* (2019.01)

(52) U.S. Cl.
CPC ...... *G06F 16/2365* (2019.01); *G06F 16/2282* (2019.01); *G06F 16/31* (2019.01)

(58) Field of Classification Search
CPC ......... G06F 17/30371; G06F 17/30339; G06F 16/2365; G06F 16/2282; G06F 16/31
USPC ........................................................ 707/689
See application file for complete search history.

(56) References Cited

U.S. PATENT DOCUMENTS

| | | | | |
|---|---|---|---|---|
| 6,226,710 B1* | 5/2001 | Melchior | ............... | G11C 15/00 711/108 |
| 2003/0177146 A1* | 9/2003 | Zimowski | ............. | G06F 16/214 |
| 2004/0111726 A1* | 6/2004 | Dilley, Jr. | ............. | G06F 17/303 719/310 |
| 2004/0225865 A1* | 11/2004 | Cox | ..................... | G06F 16/2455 712/34 |
| 2006/0123035 A1* | 6/2006 | Ivie | ................... | G06F 17/30595 |
| 2007/0288490 A1* | 12/2007 | Longshaw | .......... | G06F 11/1471 |
| 2009/0125510 A1* | 5/2009 | Graham | ............ | G06F 17/30035 |
| 2011/0219020 A1* | 9/2011 | Oks | ........................ | G06F 17/30 707/769 |
| 2012/0259824 A1* | 10/2012 | Zagelow | ............. | G06F 16/2272 707/696 |
| 2013/0117273 A1* | 5/2013 | Lee | .................... | G06F 17/30312 707/741 |
| 2014/0279855 A1* | 9/2014 | Tan | ...................... | G06F 16/2228 707/609 |
| 2015/0100557 A1* | 4/2015 | Golod | ................. | G06F 16/2343 707/696 |
| 2016/0274799 A1* | 9/2016 | Gandolfi | ............... | G06F 3/0608 |
| 2016/0292275 A1* | 10/2016 | Talton | ................. | G06F 17/2247 |
| 2016/0315633 A1* | 10/2016 | Fang | .................. | G06F 17/30371 |
| 2017/0153827 A1* | 6/2017 | Basva | ................... | G06F 3/0617 |
| 2017/0177595 A1* | 6/2017 | Kirsch | ............. | G06F 17/30085 |
| 2017/0300517 A1* | 10/2017 | Amirsoleymani | .. | G06F 16/2272 |

* cited by examiner

*Primary Examiner* — Usmaan Saeed
*Assistant Examiner* — Jessica N Le
(74) *Attorney, Agent, or Firm* — Klarquist Sparkman, LLP

(57) ABSTRACT

A framework for memory optimization of database indexes, and in particular for aging full-text index data, is described herein. In one embodiment, if, while a database table is aged, there are index tables associated with the database table, the associated index tables are automatically aged. This way, the system memory footprint will be reduced, leading to reduced cost as less system memory is required to perform remaining operations, and leading to increased performance as more system memory is available for other operations.

13 Claims, 3 Drawing Sheets

MEMORY OPTIMIZATION USING DATA AGING IN FULL TEXT INDEXES

BACKGROUND

Big data creates technical and business challenges. Given the enormous growth in the amount of data created and consumed, these challenges are expected to continue for the foreseeable future. Even as technical limitations such as database size and addressable memory tend to diminish over time, as hardware capacity and performance improves, operating costs continue to be high.

Data is often indexed, enabling quick lookup of individual items. However, this quick lookup comes at a cost of increased storage, and often, increased memory (e.g., system memory, addressable memory, etc.) footprint. While strategies have evolved for managing large data tables between low latency system memory and the higher latency disc-based storage volumes, data indexes continue to consume significant amounts of high cost, low latency system memory.

Therefore, there is a need for an improved framework that addresses the abovementioned challenges.

SUMMARY

Data aging is the process of copying data from expensive, low-latency, low-density storage, such as system memory, to relatively inexpensive, high-latency, high-density storage such as disc or tape media ("secondary storage"). One goal of data aging is to copy data such that operationally relevant data is loaded into system memory when data access is performed. Data stored in system memory is known as "current" or "HOT" data, while data stored in secondary storage is known as "historical" or "COLD" data.

Database indexes, such as full text indexes, are created for database tables in order to improve the search performance of these tables when data is accessed. For each index created, a separate data structure/table is created in which to store the index data.

However, when a database table associated with a full-text index is aged, the data in the index table(s) is not copied from the system memory into the secondary storage, but must be separately and manually unloaded. Often this operation is overlooked, leading to stale data residing in system memory, with little to no benefit to performance or cost.

In one embodiment, if, while a database table is aged, there are index tables associated with the target table, the associated index tables are automatically aged when the main table is aged. In this way, the system memory footprint will be further reduced, leading to reduced cost as less system memory is required to perform a given set of operations. At the same time, system performance will increase as more system memory will be available for other operations.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

Figure 1:
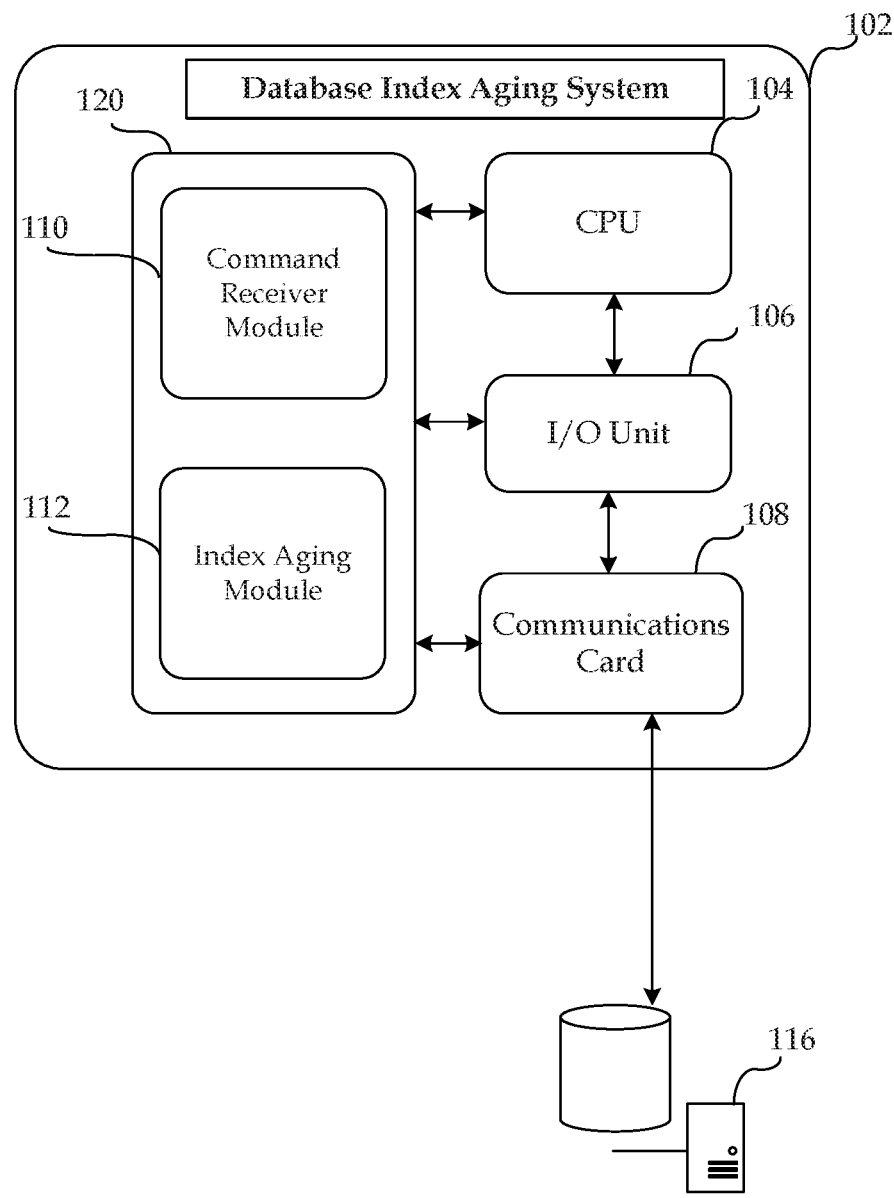
FIG. 1 is a block diagram illustrating an exemplary architecture.

FIG. 1 is a block diagram illustrating an exemplary architecture 100 that may be used to implement aging of database index data as described herein. Generally, architecture 100 may include a database index aging system 102 and a data repository 116.

The database index aging system 102 can be any type of computing device capable of responding to and executing instructions in a defined manner, such as a workstation, a server, a portable laptop computer, another portable device, a touch-based tablet, a smart phone, a mini-computer, a mainframe computer, a storage system, a dedicated digital appliance, a device, a component, other equipment, or a combination of these. The system may include a central processing unit (CPU) 104, an input/output (I/O) unit 106, a memory module 120 and a communications card or device 108 (e.g., modem and/or network adapter) for exchanging data with a network (e.g., local area network (LAN) or a wide area network (WAN)). It should be appreciated that the different components and sub-components of the system may be located on different machines or systems. Memory module 120 may include command receiver module 110 and index aging module 112.

The database index aging system 102 may be communicatively coupled to one or more other computer systems or devices via the network. For instance, the system may further be communicatively coupled to one or more data repository 116. The data repository 116 may be, for example, any database (e.g., relational database, in-memory database, object database, NoSQL database, etc.). The data repository 116 may also be referred to as a catalog, and may contain tables, views, stored procedures, indexes, full-text indexes, and the like.

Command receiver module 110 includes a logic for receiving and processing user input or automated input. In one embodiment command receiver module 110 is embedded within a database, such as data repository 116. Additionally or alternatively, command receiver module 110 may be a stand-alone agent, as depicted in FIG. 1.

In one embodiment, UNLOAD is a command that instructs the database to age a target table by copying the contents of the table to a secondary storage device, such as a disc drive, tape drive, cloud storage, or other data storage device. UNLOAD is one example of a command name. Commands with a different name but which perform the same or similar function are similarly contemplated. Once the target table has been copied, the UNLOAD command may free up the system memory that was storing the target table.

Index aging module 112 includes logic for, in response to receiving an UNLOAD command or equivalent, aging a database table and any associated indexes. In one embodiment, index ageing module 112 determines whether a database table to be aged is associated with any full-text indexes. If so, in addition to processing the UNLOAD command for the database table, any and all tables associated with the full-text indexes are also unloaded.

Figure 2:
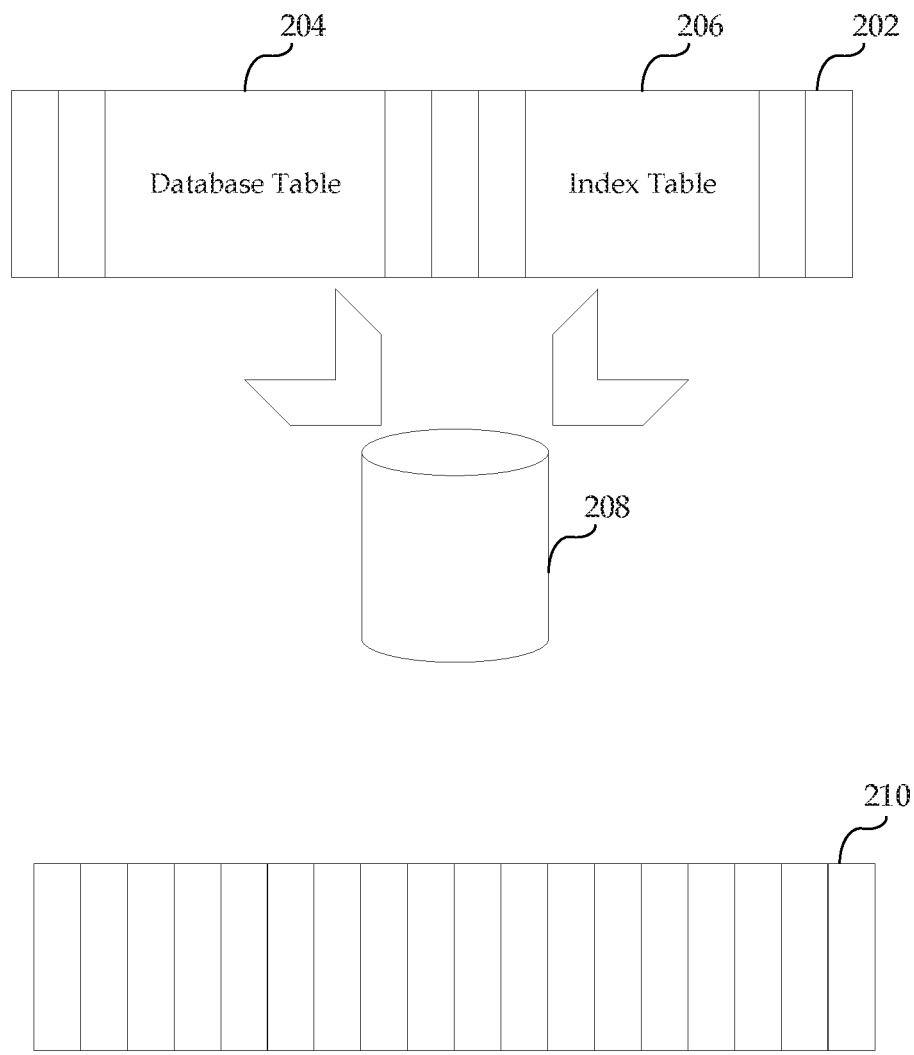
FIG. 2 illustrates one embodiment of an automatic database index aging.
Figure 2:
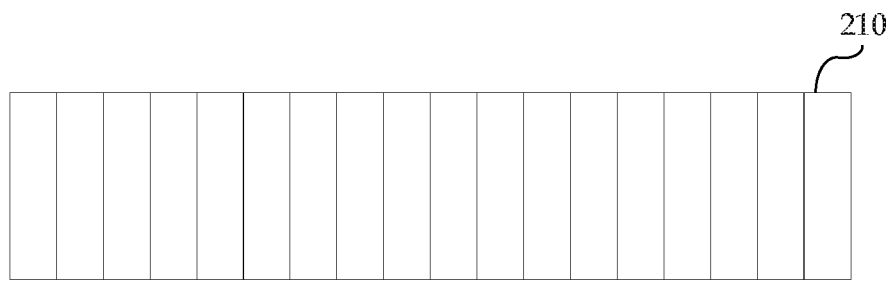

FIG. 2 illustrates a computing environment 200 for unloading database tables and tables associated with full-text indexes. FIG. 2 depicts a system memory 202, which is storing database table 204 and database index table 206. System memory 202 may, in one embodiment, reside in data repository 116. Upon receipt of an UNLOAD command for database table 204, both database table 204 and database index table 206 are copied to secondary storage 208. As such, after the operation has been completed, all of the system memory 202 previously consumed by database table 204 and database index table 206 is free for other purposes, as depicted by memory 210.

Figure 3:
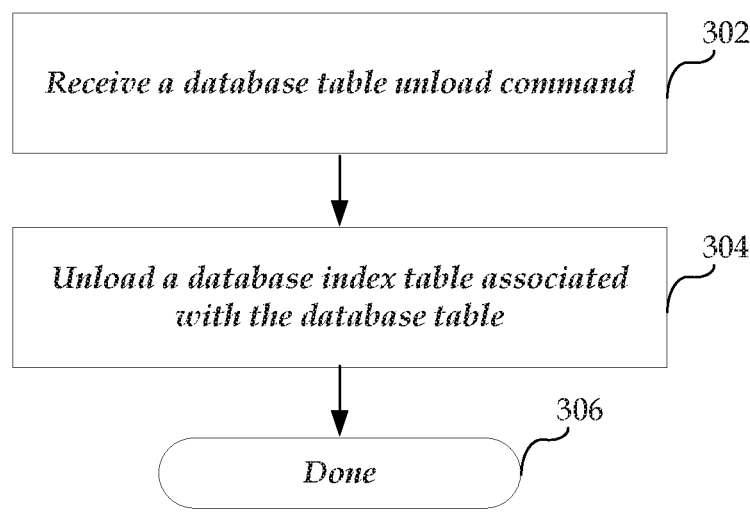
FIG. 3 is a flow chart illustrating one embodiment of an automatic database index aging.

FIG. 3 is a flow chart 300 illustrating one embodiment of aging a database table and any associated indexes. The process may be performed automatically or semi-automatically by the database index aging system 102, described above with reference to FIG. 1.

At block 302, a database table unload command is received. The command may be an UNLOAD command as is used in relational databases, such as Structured Query Language (SQL) databases, although any command that similarly copies the contents of a table to disc or other secondary storage is similarly contemplated. While the unload command may target a database table, other database objects are similarly contemplated, including views, stored procedures, and the like.

In one embodiment, the target of the unload command is a relational database table, although any type of table in any type of database is similarly contemplated, including NoSQL databases, object databases, graph databases, cloud databases, key-value databases, and the like. Other types of tables that can be similarly contemplated include sets of key-value pairs in a key-value database, sets of objects in an object database, etc.

In one embodiment, the targeted database table may be associated with an index. While full-text indexes are discussed throughout, other types of indexes are similarly contemplated, including clustered indexes. Also, other types of database objects associated with the targeted database table, such as triggers, are similarly contemplated. In general, any object stored in memory that serves little or no purpose once the target database table has been aged is also contemplated. The target database may be associated with a plurality of indexes and/or a plurality of other database objects.

At block 304, in response to the command, index aging module 112 unloads the database table and any associated database index tables. In one embodiment, such as in a relational database, indexes are stored in their own database tables. In this case, an UNLOAD command can be used to unload both the target database table and any associated database index tables. Unloading a table includes copying the contents of the table to secondary storage. Unloading may also include serializing, streaming, compressing, obfuscating, or other operations.

In another embodiment, an association between an unloaded database table and an unloaded database index tables is stored. This way, when a command is received to load the now unloaded database table, associated database index tables will also be loaded into system memory. At block 306, the process 300 ends.

The invention claimed is:

1. A computing apparatus facilitating aging of database index data, the computing apparatus comprising:
   a processor; and
   a memory storing instructions that, when executed by the processor, configures the apparatus to:
      receive a command to unload a database table, wherein the database table is associated with a database index, and wherein the database index is stored in a database index table, and
      in response to the command, unload the database table and the database index table, wherein the unloading comprises freeing memory previously consumed by the database table and freeing memory previously consumed by the database index table, and wherein the command is completed after both the database table and database index table are unloaded.

2. The computing apparatus of claim 1, wherein the database table is stored in an object database.

3. The computing apparatus of claim 1, wherein unloading the database index table includes copying data contained in the database index table from a system memory to a secondary storage.

4. The computing apparatus of claim 1, wherein the database index includes a clustered index.

5. The computing apparatus of claim 1, wherein unloading the database table is performed using a database UNLOAD command.

6. The computing apparatus of claim 1, wherein the database table is associated with a plurality of database indexes, and wherein unloading the database table and the database index table includes unloading the plurality of database indexes.

7. The computing apparatus of claim 1, wherein the database table is associated with a database index based on an entry stored in a table-index association table, wherein the entry includes an identifier of the database table and an identifier of the database index.

8. A non-transitory computer-readable storage medium facilitating aging of database object data, the non-transitory computer-readable storage medium including instructions that, when executed by a computer, cause the computer to:
   receive a command to age a target database object in a database, wherein the target database object is associated with one or more additional database objects in the database; and
   in response to the command, age the target database object and the associated one or more additional database objects, wherein the aging comprises freeing memory that was storing the target database object and freeing memory that was storing the associated one or more database objects;
   wherein the aging further comprises copying contents of the target database object and the associated one or more additional database objects to secondary storage.

9. The non-transitory computer-readable storage medium of claim 8, wherein the target database object is stored in an in-memory database.

10. The non-transitory computer-readable storage medium of claim 8, wherein aging the one or more additional database objects includes copying data for the one or more additional database objects from a system memory to the secondary storage.

11. The non-transitory computer-readable storage medium of claim 10, wherein the secondary storage includes a disc based storage medium.

12. The non-transitory computer-readable storage medium of claim 8, wherein, before being aged, the target database object and the one or more additional database objects are stored in system memory.

13. The non-transitory computer-readable storage medium of claim 8, wherein the one or more additional database objects includes at least one of a trigger, a view, a table, a stored procedure, or a database index.

\* \* \* \* \*